United States Patent
Wakatsuki

(10) Patent No.: US 10,865,930 B2
(45) Date of Patent: Dec. 15, 2020

(54) VEHICULAR EXHAUST PIPE STRUCTURE

(71) Applicant: TOYOTA JIDOSHA KABUSHIKI KAISHA, Toyota (JP)

(72) Inventor: Kazutoshi Wakatsuki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/795,433

(22) Filed: Oct. 27, 2017

(65) Prior Publication Data

US 2018/0128415 A1    May 10, 2018

(30) Foreign Application Priority Data

Nov. 4, 2016  (JP) .................................. 2016-216247

(51) Int. Cl.
*F16L 59/065*  (2006.01)
*F01N 13/14*  (2010.01)
(Continued)

(52) U.S. Cl.
CPC ............ *F16L 51/025* (2013.01); *F01N 13/08* (2013.01); *F01N 13/146* (2013.01);
(Continued)

(58) Field of Classification Search
CPC .. F01N 13/141; F01N 13/146; F01N 13/1811; F01N 13/1816; F01N 13/1822;
(Continued)

(56) References Cited

U.S. PATENT DOCUMENTS 4,125,130 A * 11/1978 Yamamoto .............. F16L 11/00
138/121
4,909,530 A * 3/1990 Tsukada ................. B60K 13/04
180/296

(Continued)

FOREIGN PATENT DOCUMENTS

DE        4107539 A1 *  9/1992   ............. F01N 13/14
JP      S59-014917 U     1/1984
(Continued)

OTHER PUBLICATIONS

Miura, K. (1969). Proposition of pseudo-cylindrical concave polyhedral shells (442). Institute of Space and Aeronautical Science, University of Tokyo [retrieved on Jan. 7, 2019]. Retrieved from the Internet <URL:https://ci.nii.ac.jp/els/contents110001101617.pdf?id=ART0001255423>. (Year: 1969).*

(Continued)

*Primary Examiner* — Kenneth Rinehart
*Assistant Examiner* — Richard K. Durden
(74) *Attorney, Agent, or Firm* — Oliff PLC

(57) ABSTRACT

A vehicular exhaust pipe structure includes an outer pipe extending along a front-rear direction of a vehicle and an inner pipe disposed inside the outer pipe along an axial direction of the outer pipe. The inner pipe is joined to the outer pipe such that a vacuum layer is formed between the inner pipe and the outer pipe. The inner pipe includes a pseudo-cylindrical concave polyhedral shell-shaped part.

5 Claims, 5 Drawing Sheets

(51) Int. Cl.
*F16L 51/02* (2006.01)
*F01N 13/18* (2010.01)
*F01N 13/08* (2010.01)
*F16L 9/00* (2006.01)

(52) U.S. Cl.
CPC .......... *F01N 13/1805* (2013.01); *F16L 9/006* (2013.01); *F16L 59/065* (2013.01); *F01N 2260/10* (2013.01); *F01N 2260/18* (2013.01); *F01N 2340/04* (2013.01); *F01N 2470/10* (2013.01); *F01N 2470/12* (2013.01); *F01N 2470/24* (2013.01)

(58) Field of Classification Search
CPC ............. F01N 2260/10; F01N 2260/18; F01N 2340/04; F01N 2470/10; F01N 2470/12; F01N 2470/24; F16L 9/006; F16L 59/075
USPC ........................................................ 180/296
See application file for complete search history.

(56) References Cited

U.S. PATENT DOCUMENTS

| | | | | |
|---|---|---|---|---|
| 5,323,989 A | * | 6/1994 | Hamada | B60K 13/04 180/296 |
| 5,331,810 A | * | 7/1994 | Ingermann | F01N 3/2006 60/272 |
| 5,445,241 A | * | 8/1995 | Nakamura | B60K 13/04 180/296 |
| 5,507,463 A | * | 4/1996 | Kobylinski | B60K 13/04 248/610 |
| 5,711,244 A | * | 1/1998 | Knapp | B63B 3/13 114/312 |
| 5,813,491 A | * | 9/1998 | Sato | B60K 13/04 180/309 |
| 5,967,193 A | * | 10/1999 | Nagai | F01N 1/006 138/110 |
| 6,105,708 A | * | 8/2000 | Amano | B60K 15/063 180/309 |
| 6,173,800 B1 | * | 1/2001 | Steenackers | B60K 13/04 180/89.2 |
| 7,331,611 B2 | * | 2/2008 | Kusu | B60K 13/04 180/309 |
| 7,383,912 B2 | * | 6/2008 | Kondo | B60K 15/06 180/296 |
| 7,997,376 B2 | * | 8/2011 | Fujita | B60K 13/04 180/296 |
| 8,522,910 B2 | * | 9/2013 | Asai | B60K 13/04 180/309 |
| 2006/0213566 A1 | * | 9/2006 | Johnson | F16L 9/18 138/111 |
| 2009/0288912 A1 | * | 11/2009 | Yamaguchi | B60K 13/04 181/227 |
| 2010/0300080 A1 | * | 12/2010 | Peters | F01N 3/2066 60/297 |
| 2011/0073209 A1 | * | 3/2011 | Eguchi | F01N 13/1816 138/121 |
| 2012/0312630 A1 | * | 12/2012 | Sakae | F01N 13/08 181/249 |
| 2018/0093562 A1 | * | 4/2018 | Murata | F01N 3/2046 |

FOREIGN PATENT DOCUMENTS

| | | |
|---|---|---|
| JP | H11-036856 A | 2/1999 |
| JP | 2001-207840 A | 8/2001 |
| JP | 2005-073463 A | 3/2005 |
| JP | 2007-270712 A | 10/2007 |
| JP | 2011-043121 A | 3/2011 |

OTHER PUBLICATIONS

Partial Translation of Notification of Reason(s) for Refusal dated Jan. 8, 2019 in Japanese Application No. 2016-216247.

* cited by examiner

VEHICULAR EXHAUST PIPE STRUCTURE

INCORPORATION BY REFERENCE

The disclosure of Japanese Patent Application No. 2016-216247 filed on Nov. 4, 2016 including the specification, drawings and abstract is incorporated herein by reference in its entirety.

BACKGROUND

1. Technical Field

The present disclosure relates to a vehicular exhaust pipe structure.

2. Description of Related Art

Japanese Unexamined Patent Application Publication No. 11-36856 (JP 11-36856 A) discloses a structure in which an exhaust pipe between a catalytic converter and an exhaust manifold of an engine is configured as a vacuum double pipe that has an outer pipe and an inner pipe and a part of the inner pipe takes the form of a bellows pipe.

SUMMARY

In an exhaust pipe that is provided with an outer pipe and an inner pipe with a vacuum layer formed between the outer pipe and the inner pipe, a decline in the temperature of the exhaust gas that circulates through the inner pipe is suppressed by the heat insulation effect of the vacuum layer. As a result, condensation of the water vapor that is contained in the exhaust gas is unlikely to occur and the generation of condensed water that is attributable to the condensation is suppressed.

When a high-temperature exhaust gas circulates through the inner pipe during high-speed traveling of a vehicle, for example, the heat insulation effect of the vacuum layer results in a difference in temperature between the outer pipe and the inner pipe. Then, a compressive load is applied to the inner pipe as a result of a difference in axial thermal elongation between the outer pipe and the inner pipe. In the structure in which a part of the inner pipe is configured as the bellows pipe, the difference in axial thermal elongation between the outer pipe and the inner pipe is absorbed by the bellows pipe being compressively deformed in an axial direction by the compressive load.

The bellows pipe has a lower spring constant in a bending direction than a cylindrical circular pipe that does not have a bellows shape. Accordingly, in a case where the compressive load is applied to the bellows pipe, the bellows pipe is likely to be deformed in the bending direction. Once the bellows pipe is deformed in the bending direction and the bellows pipe comes into contact with the outer pipe at the part where the vacuum layer is formed, heat transfer occurs at the part where the bellows pipe and the outer pipe are in contact with each other. As a result, a decline in the heat insulation effect of the vacuum layer occurs. In addition, once the bellows pipe is deformed in the bending direction and the bellows pipe is damaged, the vacuum state of the vacuum layer may not be maintained.

The present disclosure provides a vehicular exhaust pipe structure that is provided with an outer pipe and an inner pipe with a vacuum layer formed between the outer pipe and the inner pipe and is capable of maintaining the heat insulation effect of the vacuum layer.

An aspect of the present disclosure relates to a vehicular exhaust pipe structure including an outer pipe extending along a front-rear direction of a vehicle and an inner pipe disposed inside the outer pipe along an axial direction of the outer pipe. The inner pipe is joined to the outer pipe such that a vacuum layer is formed between the inner pipe and the outer pipe and the inner pipe includes a pseudo-cylindrical concave polyhedral shell-shaped part.

According to the aspect of the present disclosure, a decline in the temperature of the exhaust gas that circulates through the inner pipe is suppressed by the heat insulation effect of the vacuum layer. As a result, condensation of the water vapor that is contained in the exhaust gas is unlikely to occur and the generation of condensed water that is attributable to the condensation is suppressed.

When a high-temperature exhaust gas circulates through the inner pipe during high-speed traveling of the vehicle, for example, the heat insulation effect of the vacuum layer results in a difference in temperature between the outer pipe and the inner pipe. Then, a compressive load is applied to the inner pipe as a result of a difference in axial thermal elongation between the outer pipe and the inner pipe that results from the difference in temperature.

In the structure according to the aspect of the present disclosure, the inner pipe includes the pseudo-cylindrical concave polyhedral shell-shaped part. The inner pipe that has the pseudo-cylindrical concave polyhedral shell-shaped part has a lower spring constant in an axial compression direction than an inner pipe that has a cylindrical shape. Accordingly, in a case where the compressive load is applied to the inner pipe, the inner pipe is likely to be compressively deformed in the axial direction. By the inner pipe being compressively deformed in the axial direction, the difference in axial thermal elongation between the outer pipe and the inner pipe can be absorbed.

In addition, the inner pipe that has the pseudo-cylindrical concave polyhedral shell-shaped part has a higher spring constant in a bending direction than the cylindrical inner pipe. Accordingly, the inner pipe is unlikely to be deformed in the bending direction even in a case where the compressive load is applied to the inner pipe. Accordingly, contact between the inner pipe and the outer pipe that is attributable to deformation of the inner pipe in the bending direction is unlikely to occur and heat transfer between the inner pipe and the outer pipe that is attributable to the contact is suppressed. In addition, damage to the inner pipe that is attributable to deformation of the inner pipe in the bending direction is unlikely to occur and the vacuum state of the vacuum layer can be maintained.

Accordingly, the heat insulation effect of the vacuum layer can be maintained according to the aspect of the present disclosure.

The vehicular exhaust pipe structure according to the aspect of the present disclosure may further include a connection pipe connected to a rear end portion of the outer pipe. The outer pipe may be disposed below a protruding portion protruding downward from a vehicle body of the vehicle. The connection pipe may have a front end portion that communicates with the inner pipe and the connection pipe may have a gradient rising vertically upward toward a rear of the vehicle.

According to the aspect of the present disclosure, the connection pipe communicating with the inner pipe with its front end portion connected to the rear end portion of the outer pipe has the gradient rising vertically upward toward the rear of the vehicle, and thus condensed water generated in the inner pipe is unlikely to flow to the connection pipe and is likely to remain in the inner pipe.

In contrast, a decline in the temperature of the exhaust gas that circulates through the inner pipe is suppressed by the heat insulation effect of the vacuum layer formed between the outer pipe and the inner pipe. As a result, the generation of condensed water that is attributable to the condensation of the water vapor contained in the exhaust gas is suppressed in the inner pipe in which condensed water is likely to remain.

In addition, the heat insulation effect of the vacuum layer is maintained by the use of the inner pipe that has the pseudo-cylindrical concave polyhedral shell-shaped part as described above, and thus the generation of condensed water in the inner pipe in which condensed water is likely to remain is effectively suppressed. Accordingly, a decrease in the flow path area of the inner pipe and a decline in the anti-rust performance of the inner pipe attributable to the accumulation of condensed water can be suppressed.

In the vehicular exhaust pipe structure according to the aspect of the present disclosure, a load capacity of the pseudo-cylindrical concave polyhedral shell-shaped part of the inner pipe in a bending direction may exceed a load capacity of a circular pipe having a cylindrical shape in the bending direction.

According to the aspect of the present disclosure, an excellent effect is achieved by the configuration being adopted that allows the heat insulation effect of the vacuum layer to be maintained.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinafter, an example of an embodiment of the present disclosure will be described based on accompanying drawings. The arrows RR, UP, and RH appropriately shown in each of the drawings represent the rear, upper, and right sides of a vehicle, respectively. In the following description, the front-rear, right-left, and up-down directions of the vehicle will be simply referred to as front-rear, right-left, and up-down in some cases, respectively.

The "vehicle side view" that is used in the following description refers to a case where the vehicle is seen from a first side in the width direction of the vehicle toward a second side in the width direction of the vehicle and includes a case where some of its component parts are seen through.

Vehicular Exhaust Pipe Structure 10

A vehicular exhaust pipe structure 10 according to the present embodiment will be described first.

Figure 1:
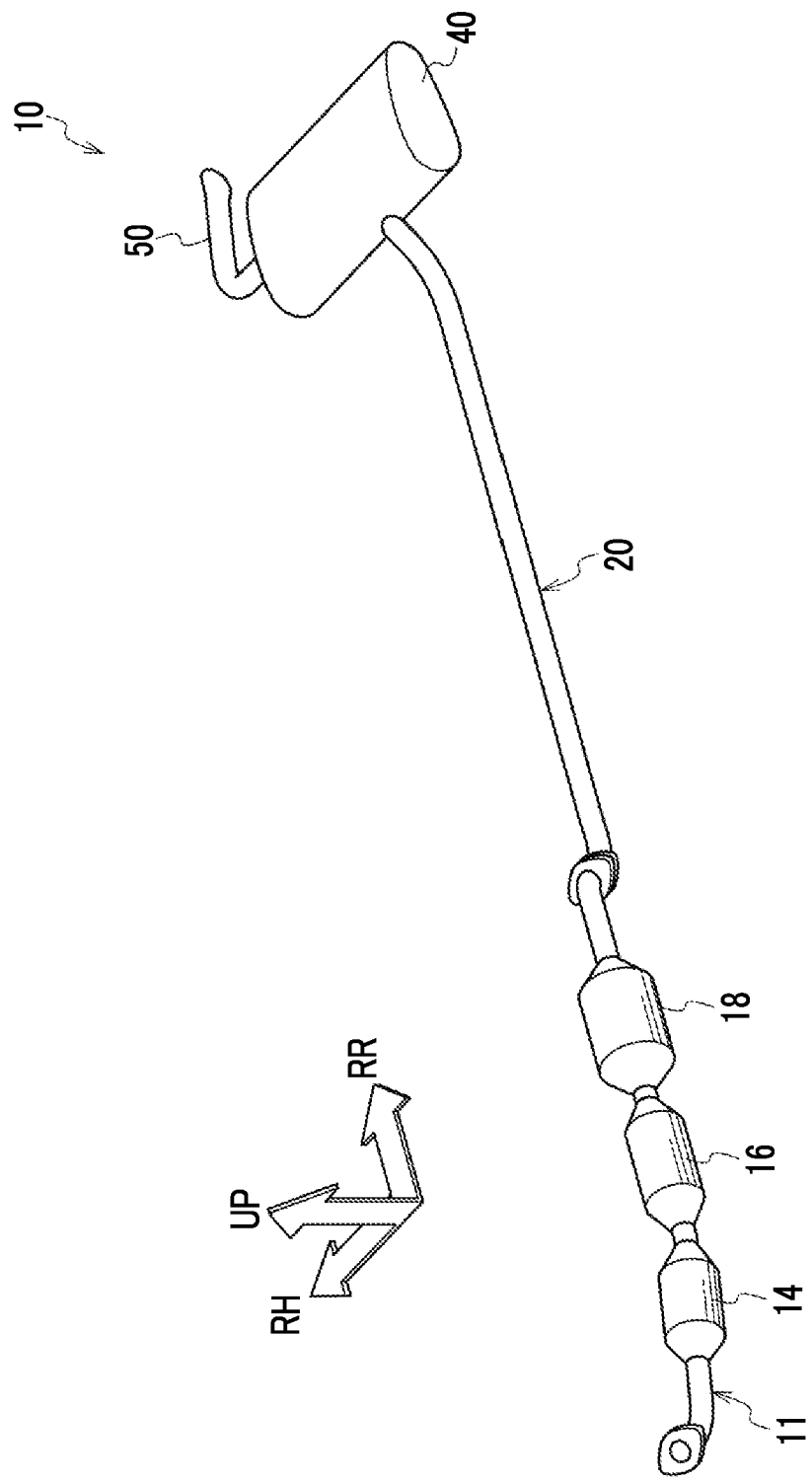
FIG. 1 is a perspective view illustrating a vehicular exhaust pipe structure according to the present embodiment.
Figure 2:
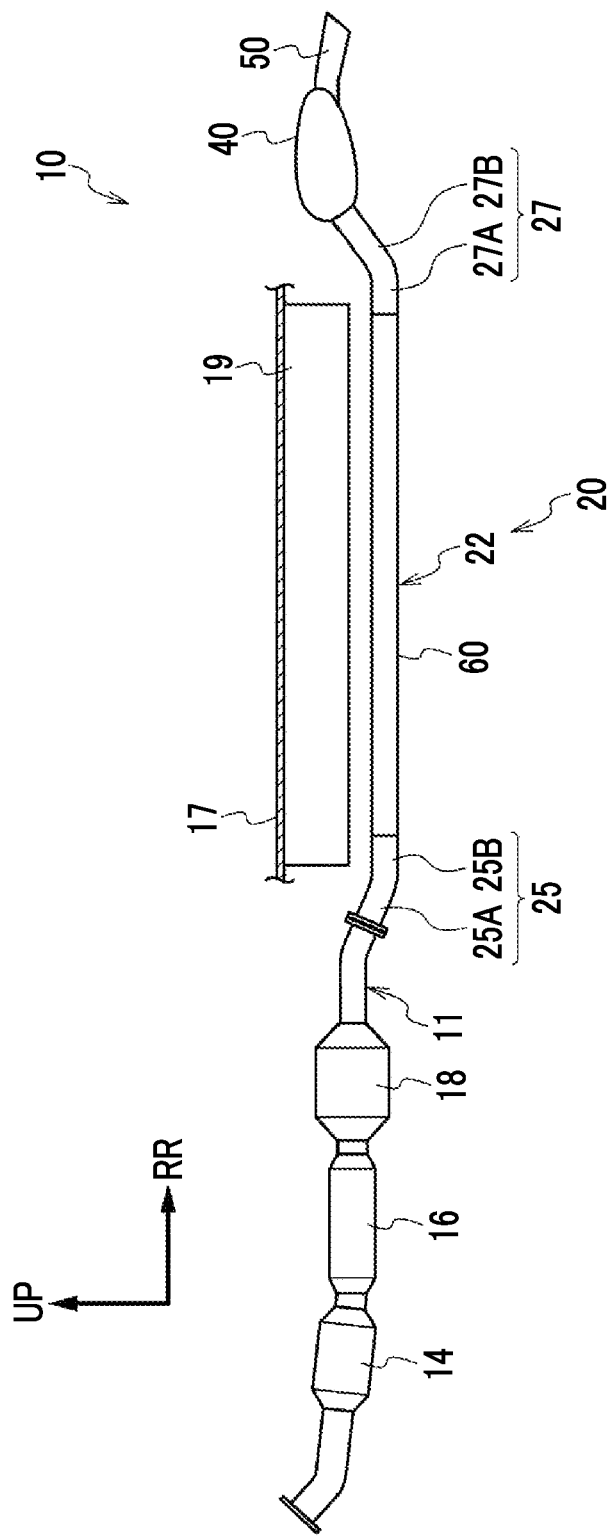
FIG. 2 is a side view illustrating the vehicular exhaust pipe structure according to the present embodiment.

FIGS. 1 and 2 are a perspective view and a side view illustrating the vehicular exhaust pipe structure 10, respectively. In each of the drawings including FIGS. 1 and 2, the structure is illustrated in a simplified manner for easy understanding of the vehicular exhaust pipe structure 10 according to the present embodiment.

The vehicular exhaust pipe structure 10 is a pipe structure for discharging the exhaust gas that is discharged from an engine (not illustrated) to the atmosphere (to the outside of the vehicle). Specifically, the vehicular exhaust pipe structure 10 has a first exhaust pipe 11, a second exhaust pipe 20, a main muffler 40, and a discharge pipe 50 as illustrated in FIG. 1.

As illustrated in FIG. 1, the first exhaust pipe 11 is configured as a pipe that extends along the front-rear direction of the vehicle. The first exhaust pipe 11 has a front end portion that is connected to the engine (not illustrated). As a result, the exhaust gas from the engine flows in from the front end portion of the first exhaust pipe 11 and circulates to the rear side of the vehicle (to the rear end portion of the first exhaust pipe 11).

A catalytic converter 14, an exhaust heat recovery unit 16, and a submuffler 18 are disposed on the first exhaust pipe 11 in this order from the front side of the vehicle. The catalytic converter 14 has a function to control the exhaust gas by removing certain substances from the exhaust gas passing through the catalytic converter 14.

The exhaust heat recovery unit 16 has a function to recover the heat of the exhaust gas and reuse the heat by performing heat exchange with a heat medium such as water. The submuffler 18 has a function to reduce the exhaust sound of the exhaust gas.

As illustrated in FIG. 1, the second exhaust pipe 20 is configured as a pipe that extends along the front-rear direction of the vehicle. The second exhaust pipe 20 has a front end portion that communicates with the rear end portion of the first exhaust pipe 11. As a result, the exhaust gas from the first exhaust pipe 11 flows in from the front end portion of the second exhaust pipe 20 and circulates to the rear side of the vehicle (to the rear end portion of the second exhaust pipe 20). The configuration of the second exhaust pipe 20 will be described in further detail later.

As illustrated in FIG. 2, the main muffler 40 is disposed on the upper rear side of the vehicle with respect to the second exhaust pipe 20. The rear end portion of the second exhaust pipe 20 communicates with the main muffler 40. As a result, the exhaust gas flows into the main muffler 40 from the second exhaust pipe 20. The main muffler 40 has a function to reduce the exhaust sound of the exhaust gas flowing into the main muffler 40.

The discharge pipe 50 extends to the right side of the vehicle from the main muffler 40 and is curved to the rear side of the vehicle. The discharge pipe 50 allows the exhaust gas to be discharged to the atmosphere from the main muffler 40.

Specific Configuration of Second Exhaust Pipe 20

As illustrated in FIG. 2, the second exhaust pipe 20 has an upstream pipe 25 constituting the upstream side part of the second exhaust pipe 20, a downstream pipe 27 constituting the downstream side part of the second exhaust pipe 20, and a double pipe 22 disposed between the upstream pipe 25 and the downstream pipe 27. The downstream pipe 27 is an example of a connection pipe.

As illustrated in FIG. 2, the upstream pipe 25 has an inclined portion 25A and a horizontal portion 25B. The inclined portion 25A has a gradient falling vertically downward toward the rear of the vehicle. The horizontal portion 25B extends along the front-rear direction of the vehicle. The upstream pipe 25 communicates with the first exhaust pipe 11 by the front end portion of the inclined portion 25A being connected to the rear end portion of the first exhaust pipe 11. The horizontal portion 25B has a front end portion that communicates with the rear end portion of the inclined portion 25A.

The downstream pipe 27 has a horizontal portion 27A and an inclined portion 27B. The horizontal portion 27A extends along the front-rear direction of the vehicle. The inclined portion 27B has a gradient rising vertically upward toward the rear of the vehicle. The horizontal portion 27A has a rear end portion that communicates with the front end portion of the inclined portion 27B. The downstream pipe 27 communicates with the main muffler 40 by the rear end portion of the inclined portion 27B being connected to the main muffler 40.

The double pipe 22 is disposed below a fuel tank 19 protruding downward from a vehicle body 17 (such as a floor panel), the fuel tank 19 being an example of a protruding portion, and thus the double pipe 22 constitutes the lowermost part of the exhaust pipe in the vehicular exhaust pipe structure 10 (its part that is disposed on the lowermost side). In the present embodiment, the fuel tank 19 as an example of the protruding portion protruding downward from the vehicle body 17 (such as the floor panel) is disposed beneath the vehicle body 17 as described above.

Figure 3:
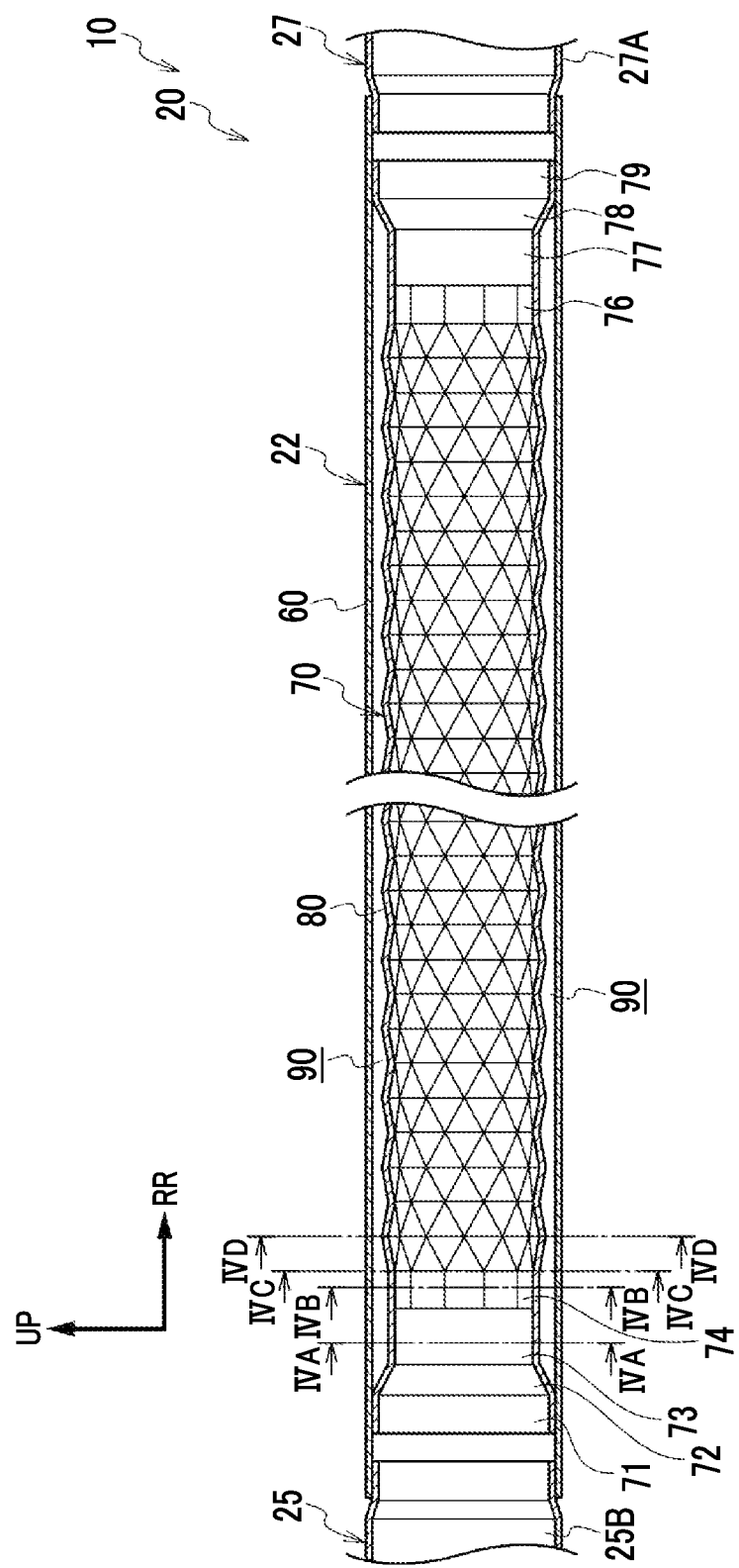
FIG. 3 is a side sectional view of a double pipe according to the present embodiment.

Specifically, the double pipe 22 has an outer pipe 60 and an inner pipe 70 as illustrated in FIG. 3. The outer pipe 60 extends along the front-rear direction of the vehicle. The inner pipe 70 is disposed inside the outer pipe 60 along the axial direction of the outer pipe 60.

The outer pipe 60 is configured as a circular pipe that has a cylindrical shape. The front end portion (first end portion) of the outer pipe 60 is connected to the rear end portion of the horizontal portion 25B of the upstream pipe 25. The upstream pipe 25 and the inner pipe 70 communicate with each other. Specifically, the outer pipe 60 and the upstream pipe 25 are connected to each other by the rear end portion of the horizontal portion 25B being inserted into the front end portion of the outer pipe 60 and joined to the front end portion of the outer pipe 60 by welding or the like. The rear end portion (second end portion) of the outer pipe 60 is connected to the front end portion of the horizontal portion 27A of the downstream pipe 27 and the downstream pipe 27 and the inner pipe 70 communicate with each other. Specifically, the outer pipe 60 and the downstream pipe 27 are connected to each other by the front end portion of the horizontal portion 27A being inserted into the rear end portion of the outer pipe 60 and joined to the rear end portion of the outer pipe 60 by welding or the like.

The inner pipe 70 has joints 71, 79, tapered portions 72, 78, cylindrical portions 73, 77, polygonal portions 74, 76, and a shell-shaped portion 80. The inner pipe 70 is bilaterally symmetrical. In the following description, the side that forms the middle portion of the inner pipe 70 in its axial direction in the directions that reach the middle portion from both axial end portions of the inner pipe 70 will be referred to as its axial inside in some cases.

The joints 71, 79 constitute both of the axial end portions of the inner pipe 70 and have a cylindrical shape. The outer peripheral surfaces of the joints 71, 79 are joined by welding or the like to the inner peripheral surface of the outer pipe 60. The joints 71, 79 are joined to the outer pipe 60 in a state where the inner pipe 70 is smaller in axial length than the outer pipe 60 and both axial end portions of the outer pipe 60 protrude more to the outside than both of the axial end portions of the inner pipe 70.

The tapered portions 72, 78 have a tapered shape and their diameters are reduced toward the axial inside from the end portions of the joints 71, 79 on the axial inside. As a result, the tapered portions 72, 78 become gradually and increasingly distant from the inner peripheral surface of the outer pipe 60 as they become closer to the middle side of the inner pipe 70 in the axial direction.

Figure 4:
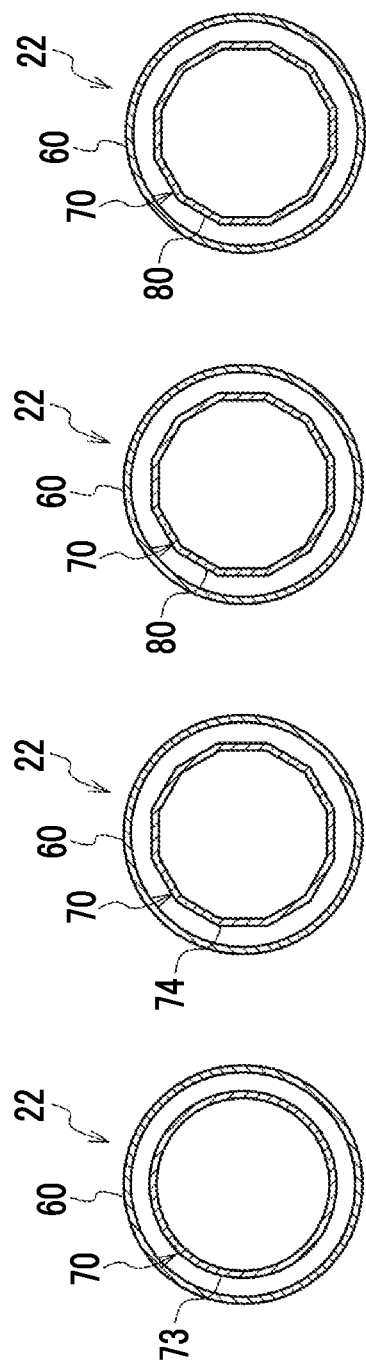
FIG. 4A is a cross-sectional view in which the double pipe according to the present embodiment is seen in an axial direction, which is a cross-sectional view taken along line IVA-IVA of FIG. 3.
FIG. 4B is a cross-sectional view in which the double pipe according to the present embodiment is seen in the axial direction, which is a cross-sectional view taken along line IVB-IVB of FIG. 3.
FIG. 4C is a cross-sectional view in which the double pipe according to the present embodiment is seen in the axial direction, which is a cross-sectional view taken along line IVC-IVC of FIG. 3.
FIG. 4D is a cross-sectional view in which the double pipe according to the present embodiment is seen in the axial direction, which is a cross-sectional view taken along line IVD-IVD of FIG. 3.

The cylindrical portions 73, 77 have a cylindrical shape (refer to FIG. 4A) and extend to the axial inside from the end portions of the tapered portions 72, 78 that are on the axial inside. The outer diameter of the cylindrical portions 73, 77 is substantially equal to the outer diameter of the end portions of the tapered portions 72, 78 on the axial inside. The inner diameter of the outer pipe 60 exceeds the outer diameter of the cylindrical portions 73, 77. The outer peripheral surfaces of the cylindrical portions 73, 77 are separated from the inner peripheral surface of the outer pipe 60.

The polygonal portions 74, 76 extend to the axial inside from the end portions of the cylindrical portions 73, 77 on the axial inside, respectively. The end portions of the polygonal portions 74, 76 on the axial inside lead to first and second axial end portions of the shell-shaped portion 80, respectively. The polygonal portions 74, 76 take the form of a tubular body (refer to FIG. 4B) that has a polygonal shape (such as the shape of a regular dodecagon). Specifically, the polygonal shape is identical to that of both end portions of the shell-shaped portion 80 in the axial direction (refer to FIG. 4C). The inner diameter of the outer pipe 60 exceeds that of the circumcircles of the polygonal portions 74, 76. The outer peripheral surfaces of the polygonal portions 74, 76 are separated from the inner peripheral surface of the outer pipe 60.

Figure 5:
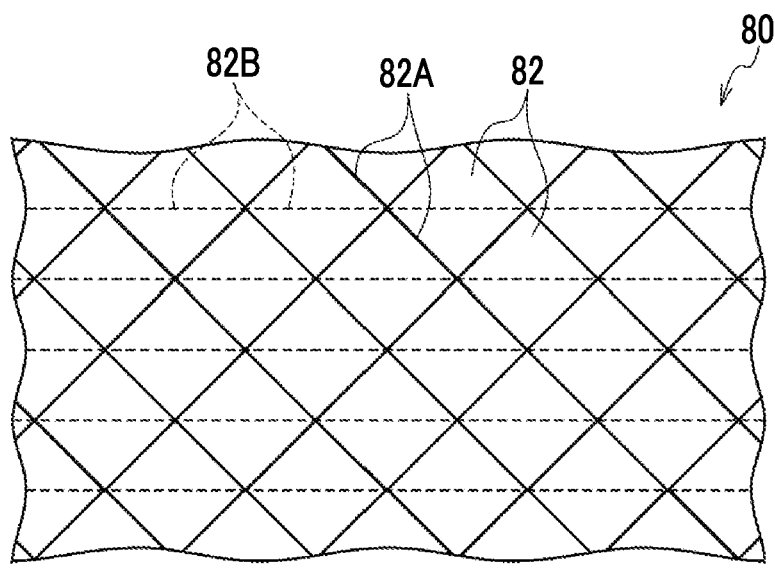
FIG. 5 is an expansion plan of a part of an inner pipe according to the present embodiment.

The shell-shaped portion 80 has the shape of a pseudo-cylindrical concave polyhedral shell (PCCP shell). The PCCP shell shape is what is referred to as a so-called pseudo-cylindrical concave polyhedron and is formed by triangular flat surfaces being stereoscopically combined. Specifically, the shell-shaped portion 80 is a polyhedral structure in which the surfaces of adjacent triangular flat surfaces 82 share one side and are unevenly concatenated such that the sides shared by the surfaces of the triangular flat surfaces 82 form mountain ridge lines 82A (shown by the solid lines) or valleys 82B (shown by the dashed lines) as illustrated in FIG. 5 (expansion plan of a part of the shell-shaped portion 80).

A PCCP shell-shaped pipe has a lower spring constant in an axial compression direction and a higher spring constant in a bending direction than a circular pipe that has a cylindrical shape. Specifically, the load capacity of the PCCP shell-shaped pipe in the compression direction is, for example, one-fourth of the load capacity of the cylindrical circular pipe in the compression direction and the load capacity of the PCCP shell-shaped pipe in the bending direction is, for example, twice the load capacity of the cylindrical circular pipe in the bending direction.

Figure 6:
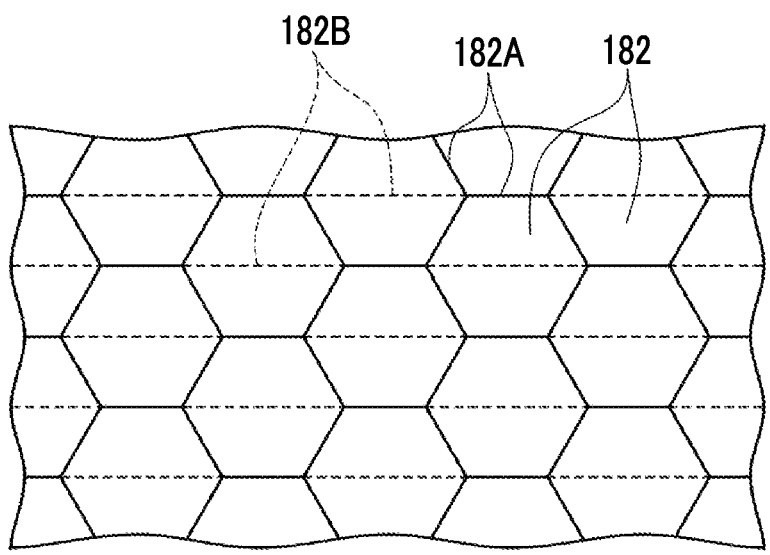
FIG. 6 is an expansion plan of a part of an inner pipe according to a modification example.

The PCCP shell shape may also be formed by trapezoidal flat surfaces being stereoscopically combined as illustrated in FIG. 6. The configuration that is illustrated in FIG. 6 is a polyhedral structure in which the surfaces of adjacent trapezoidal flat surfaces 182 share one side and are unevenly concatenated such that the sides shared by the surfaces of the trapezoidal flat surfaces 182 form mountain ridge lines 182A (shown by the solid lines) or valleys 182B (shown by the dashed lines).

The shell-shaped portion 80 constitutes a part that includes the middle of the inner pipe 70 in the axial direction. The shell-shaped portion 80 is larger in axial length than the joints 71, 79, the tapered portions 72, 78, the cylindrical portions 73, 77, and the polygonal portions 74, 76. The axial length of the shell-shaped portion 80 is at least equal to or greater than half of the axial length of the inner pipe 70 and is equal to or greater than half of the axial length of the outer pipe 60.

The circumcircle of the shell-shaped portion 80 is smaller in inner diameter than the outer pipe 60 at any part of the shell-shaped portion 80 in the axial direction. The outer peripheral surface of the shell-shaped portion 80 is separated from the inner peripheral surface of the outer pipe 60.

As described above, the inner pipe 70 is disposed in a state where it is separated from the outer pipe 60 in each of its portions other than the joints 71, 79. A vacuum layer 90 is formed between the inner pipe 70 and the outer pipe 60. The internal pressure of the vacuum layer 90 is at least lower than the atmospheric pressure. For example, a pressure of approximately $10^3$ Pa is set as the internal pressure of the vacuum layer 90. At the part where the vacuum layer 90 is formed, the inner pipe 70 and the outer pipe 60 are not in contact with each other. At the part where the vacuum layer 90 is formed, a supporting member supporting the inner pipe 70 in contact with the inner pipe 70 and the outer pipe 60 is not disposed, either.

Action and Effects of Vehicular Exhaust Pipe Structure 10

The action and effects of the vehicular exhaust pipe structure 10 will be described below.

The vehicular exhaust pipe structure 10 allows the exhaust gas discharged from the engine (not illustrated) to be discharged to the atmosphere through the first exhaust pipe 11, the second exhaust pipe 20, the main muffler 40, and the discharge pipe 50 (refer to FIG. 1).

In the vehicular exhaust pipe structure 10, the double pipe 22 of the second exhaust pipe 20 is disposed below the fuel tank 19 protruding downward from the vehicle body as illustrated in FIG. 2. Accordingly, the double pipe 22 constitutes the lowermost part of the exhaust pipe in the vehicular exhaust pipe structure 10 (its part that is disposed on the lowermost side). The front end portion of the downstream pipe 27 is connected to the rear end portion of the outer pipe 60 of the double pipe 22, the downstream pipe 27 has the inclined portion 27B, and the inclined portion 27B has the gradient rising vertically upward toward the rear of the vehicle. Accordingly, condensed water generated in the inner pipe 70 is unlikely to flow to the downstream pipe 27 and is likely to remain in the inner pipe 70.

In the vehicular exhaust pipe structure 10, in contrast, the vacuum layer 90 is formed between the inner pipe 70 and the outer pipe 60 of the double pipe 22 as illustrated in FIG. 3. A decline in the temperature of the exhaust gas that circulates through the inner pipe 70 is suppressed by the heat insulation effect of the vacuum layer 90. As a result, condensation of the water vapor that is contained in the exhaust gas is unlikely to occur and the generation of condensed water that is attributable to the condensation is suppressed in the inner pipe 70 in which condensed water is likely to remain.

When a high-temperature exhaust gas circulates through the inner pipe 70 during high-speed traveling of the vehicle, for example, the heat insulation effect of the vacuum layer 90 results in a difference in temperature between the outer pipe 60 and the inner pipe 70. Then, a compressive load is applied to the inner pipe 70 as a result of a difference in axial thermal elongation between the outer pipe 60 and the inner pipe 70 that results from the difference in temperature.

In the vehicular exhaust pipe structure 10, the shell-shaped portion 80 of the inner pipe 70 has the PCCP shell shape. A PCCP shell-shaped pipe has a lower spring constant in the axial compression direction than a circular pipe that has a cylindrical shape. Accordingly, in a case where the compressive load is applied to the inner pipe 70, the shell-shaped portion 80 is likely to be compressively deformed in the axial direction. By the shell-shaped portion 80 being compressively deformed in the axial direction, the difference in axial thermal elongation between the outer pipe 60 and the inner pipe 70 can be absorbed.

In a structure (according to a comparative example) using the inner pipe 70 that has the shell-shaped portion 80 which has a bellows shape instead of the PCCP shell shape, the difference in axial thermal elongation between the outer pipe 60 and the inner pipe 70 can be absorbed by the shell-shaped portion 80 being compressively deformed in the axial direction as is the case with the inner pipe 70 according to the present embodiment in a case where the compressive load is applied to the inner pipe 70.

However, the shell-shaped portion 80 is likely to be deformed in the bending direction in a case where the compressive load is applied to the inner pipe 70 since the bellows pipe is lower in spring constant in the bending direction than a circular pipe that has a cylindrical shape. Once the shell-shaped portion 80 is deformed in the bending direction and comes into contact with the outer pipe 60, heat transfer occurs at the part where the shell-shaped portion 80 and the outer pipe 60 are in contact with each other. As a result, a decline in the heat insulation effect of the vacuum layer 90 occurs. In addition, once the shell-shaped portion 80 is deformed in the bending direction and the shell-shaped portion 80 is damaged, the vacuum state of the vacuum layer 90 may not be maintained.

The inner pipe 70 that has the shell-shaped portion 80 which has the PCCP shell shape, in contrast, is higher in spring constant in the bending direction than an inner pipe that has a cylindrical shape. Accordingly, the inner pipe 70 is unlikely to be deformed in the bending direction even in a case where the compressive load is applied to the inner pipe 70. Accordingly, contact between the inner pipe 70 and the outer pipe 60 that is attributable to deformation of the inner pipe 70 in the bending direction is unlikely to occur and heat transfer between the inner pipe 70 and the outer pipe 60 that is attributable to the contact is suppressed. In addition, damage to the inner pipe 70 that is attributable to deformation of the inner pipe 70 in the bending direction is unlikely to occur and the vacuum state of the vacuum layer 90 can be maintained.

Accordingly, the heat insulation effect of the vacuum layer 90 can be maintained with the vehicular exhaust pipe structure 10. In addition, the length of the double pipe 22

(inner pipe 70 and outer pipe 60) can be increased without a supporting member supporting the inner pipe 70 being disposed between the inner pipe 70 and the outer pipe 60 since contact is unlikely to occur between the inner pipe 70 and the outer pipe 60.

With the vehicular exhaust pipe structure 10, the generation of condensed water in the inner pipe 70 in which condensed water is likely to remain can be effectively suppressed by the heat insulation effect of the vacuum layer 90 as described above. In addition, the heat insulation effect of the vacuum layer 90 can be maintained by the use of the inner pipe 70 that has the shell-shaped portion 80 which has the PCCP shell shape. Accordingly, a decrease in the flow path area of the second exhaust pipe 20 and a decline in the anti-rust performance of the second exhaust pipe 20 attributable to the accumulation of condensed water can be effectively suppressed.

Accordingly, a rise in pressure loss that is attributable to a decrease in the flow path area of the second exhaust pipe 20 is suppressed and effects such as a decline in engine output are suppressed. By a decline in the anti-rust performance of the second exhaust pipe 20 being suppressed, a low-rust resistance material and a thin plate material can be used for material of the second exhaust pipe 20.

An applicable embodiment of the present disclosure is not limited to the embodiment described above. The present disclosure can be modified, changed, and improved in various ways without departing from the scope of the present disclosure.

In the present embodiment, the double pipe 22 is disposed at the lowermost part of the exhaust pipe in the vehicular exhaust pipe structure 10 (its part that is disposed on the lowermost side). An applicable embodiment of the present disclosure is not limited thereto. For example, the double pipe 22 may also be applied to the first exhaust pipe 11, the upstream pipe 25 and the downstream pipe 27 of the second exhaust pipe 20, and so on.

What is claimed is:

1. A vehicular exhaust pipe structure comprising:
    an outer pipe configured to extend along a front-rear direction of a vehicle when the vehicular exhaust pipe structure is mounted to the vehicle;
    an inner pipe disposed inside the outer pipe along an axial direction of the outer pipe, the inner pipe being joined to the outer pipe such that a vacuum layer is formed between the inner pipe and the outer pipe, the inner pipe including a pseudo-cylindrical concave polyhedral shell-shaped part; and
    a connection pipe connected to a rear end portion of the outer pipe, wherein:
    the outer pipe is configured to be disposed directly below a fuel tank of the vehicle when the vehicular exhaust pipe structure is mounted to the vehicle such that the fuel tank overlaps with an entire length of the outer pipe, the fuel tank protruding downward from a vehicle body of the vehicle when the vehicular exhaust pipe structure is mounted to the vehicle;
    the connection pipe communicates with the inner pipe;
    the connection pipe has a gradient rising vertically upward toward a rear of the vehicle;
    the inner pipe includes cylindrical portions and polygonal portions;
    the polygonal portions extend to an axial inside from axial inside end portions of the cylindrical portions, respectively; and
    axial inside end portions of the polygonal portions are continuous with first and second axial end portions of the pseudo-cylindrical concave polyhedral shell-shaped part, respectively.

2. A vehicle having a fuel tank and a vehicular exhaust pipe structure, the fuel tank protruding downward from a vehicle body of the vehicle, the vehicular exhaust pipe structure comprising:
    an outer pipe extending along a front-rear direction of the vehicle;
    an inner pipe disposed inside the outer pipe along an axial direction of the outer pipe, the inner pipe being joined to the outer pipe such that a vacuum layer is formed between the inner pipe and the outer pipe, the inner pipe including a pseudo-cylindrical concave polyhedral shell-shaped part; and
    a connection pipe connected to a rear end portion of the outer pipe, wherein
    the outer pipe is disposed directly below the fuel tank such that the fuel tank overlaps with an entire length of the outer pipe;
    the connection pipe communicates with the inner pipe; and
    the connection pipe has a gradient rising vertically upward toward a rear of the vehicle.

3. The vehicle according to claim 2, wherein a load capacity in a bending direction of the pseudo-cylindrical concave polyhedral shell-shaped part of the inner pipe exceeds a load capacity in a bending direction of a circular pipe having a cylindrical shape and having a size identical to a size of the pseudo-cylindrical concave polyhedral shell-shaped part of the inner pipe.

4. The vehicle according to claim 2, wherein an outer diameter of the outer pipe is constant over an entire length of the outer pipe.

5. A vehicular exhaust pipe structure comprising:
    an outer pipe configured to extend along a front-rear direction of a vehicle when the vehicular exhaust pipe structure is mounted to the vehicle;
    an inner pipe disposed inside the outer pipe along an axial direction of the outer pipe, the inner pipe being joined to the outer pipe such that a vacuum layer is formed between the inner pipe and the outer pipe, the inner pipe including a pseudo-cylindrical concave polyhedral shell-shaped part;
    a connection pipe connected to a rear end portion of the outer pipe; and
    a sub-muffler, wherein:
    the outer pipe is configured to be disposed directly below a fuel tank of the vehicle when the vehicular exhaust pipe structure is mounted to the vehicle such that the fuel tank overlaps with an entire length of the outer pipe, the fuel tank protruding downward from a vehicle body of the vehicle when the vehicular exhaust pipe structure is mounted to the vehicle;
    the connection pipe communicates with the inner pipe;
    the connection pipe has a gradient rising vertically upward toward a rear of the vehicle; and
    the outer pipe is a lowermost portion of the vehicular exhaust pipe structure and positioned lower than the sub-muffler.

* * * * *